United States Patent [19]

Katchman

[11] 4,341,882
[45] Jul. 27, 1982

[54] LOW RESISTIVITY THERMOPLASTIC COMPOSITIONS

[75] Inventor: Arthur Katchman, Delmar, N.Y.

[73] Assignee: General Electric Company, Pittsfield, Mass.

[21] Appl. No.: 296,589

[22] Filed: Aug. 27, 1981

[51] Int. Cl.³ ............................................. C08L 61/04
[52] U.S. Cl. ...................................... 525/68; 525/92; 525/133; 525/905
[58] Field of Search ................... 525/68, 92, 133, 905; 528/408

[56] References Cited

U.S. PATENT DOCUMENTS

| | | | |
|---|---|---|---|
| 3,323,557 | 7/1976 | Magat et al. | 528/408 |
| 3,383,435 | 5/1968 | Cizek | 525/68 |
| 3,658,945 | 4/1972 | Nakashio et al. | 525/68 |
| 3,943,191 | 3/1976 | Cooper et al. | 525/68 |
| 3,959,211 | 5/1976 | Cooper et al. | 525/68 |
| 3,974,235 | 8/1976 | Cooper et al. | 525/68 |
| 4,101,503 | 7/1978 | Cooper et al. | 525/68 |
| 4,101,504 | 7/1978 | Cooper et al. | 525/68 |
| 4,101,505 | 7/1978 | Cooper et al. | 525/68 |
| 4,102,850 | 7/1978 | Cooper et al. | 525/68 |
| 4,123,475 | 10/1978 | Abolins et al. | 525/68 |

Primary Examiner—J. Ziegler
Attorney, Agent, or Firm—Hedman, Casella, Gibson and Costigan

[57] ABSTRACT

Improved thermoplastic compositions are described. These compositions exhibit low resistivities making them particularly suitable for use in electrical applications. These compositions comprise a composition of polyphenylene ether and alkenyl aromatic resins in combination with an effective amount of anti-static agent. The anti-static agent is a styrene-allyl alcohol copolymer, anionically polymerized poly(ethylene oxide) or a combination thereof.

9 Claims, No Drawings

LOW RESISTIVITY THERMOPLASTIC COMPOSITIONS

BACKGROUND OF THE INVENTION

Thermoplastic compositions containing polyphenylene ether (or oxide) in admixture with alkenyl aromatic resins are well-known. Examples are, for example, described in U.S. Pat. No. 3,383,435 of Eric P. Cizek. Such compositions are most generally employed in the production of molded and/or extruded articles.

It is known in the art that various of the properties of these compound compositions may be further improved by copolymerizing the alkenyl aromatics with other monomers or by blending with other resins. Modifiers such as butadiene, for example, are customarily incorporated into the alkenyl aromatic resins to improve the properties of the resultant compositions. Such rubber-modified resins provide means for overcoming various physical drawbacks of alkenyl aromatic resins, particularly polystyrene, while simultaneously facilitating the processing of polyphenylene ethers.

As is described in the art, butadiene modification of alkenyl aromatic resins may take many forms. Polybutadiene or copolymers partially derived from butadiene may be graft, block or otherwise polymerized with such alkenyl aromatic resins. The resultant product may also be unsaturated or saturated (for example, by subsequent hydrogenation) without loss of desirability.

Other rubber-modifiers are also known. In, for example, U.S. Pat. No. 3,658,945 of Nakashlo et al, it is disclosed that alkenyl aromatic resins may be graft-modified onto ethylene-α-olefin-polyene terpolymer. From 0.5 to 15% of terpolymer by total composition weight, where the graft copolymer contains from 5 to 80% of styrene compound, is indicated to enhance impact strength at levels up to about 30% of copolymer by total compositions weight. Further rubber-modified graft copolymers are described in U.S. Pat. Nos. 3,943,191; 3,959,211; 3,974,235; 4,101,503; 4,101,504; 4,101,505 and 4,102,850 of Glenn D. Cooper et al and elsewhere.

Polyphenylene ether-alkenyl aromatic resins compositions (particularly those having rubber-modified alkenyl aromatic resin) generally possess outstanding physical properties. A shortcoming of these compositions, however, is their tendency to accumulate surface electrostatic charges. Theremoplastic materials having characteristic resistivities in the range of from about $10^{10}$ to $10^{12}$ ohms normally do not hold static charges. On the other hand, thermoplastic materials characterized by resistivities in the range of from about $10^{16}$ to $10^{18}$ ohms often develop high static voltages, and polyphenylene ether-alkenyl aromatic resins are often in this latter group.

Such static charges develop during processing and/or during normal use after molding. They are undesirable for a number of reasons: surface static charges readily attract dust and other contaminants which are unsightly and difficult to clean; often the contaminants or static charges themselves cause processing problems; the charges may accumulate to a level where an unpleasant electrical shock is imparted upon touching. In addition, a high level of static charges in a molded part covering sensitive electronic equipment may be undesirable.

It is therefore an object of the present invention to produce thermoplastic compositions having a low resistivity and which will thereby have improved properties, in particular for electrical applications.

INTRODUCTION TO THE INVENTION

In accordance with the present invention, thermoplastic compositions having a low resistivity are produced. These compositions comprise polyphenylene ether and alkenyl aromatic resin. Their improved electrical properties are imparted by incorporation of an effective amount of an anti-static agent selected from the group consisting of styrene-allyl alcohol copolymer, anionically polymerized poly(ethylene oxide) and a combination thereof.

DESCRIPTION OF THE INVENTION

The polyphenylene ether (or oxide) resins useful in accordance with the present compositions are, previously indicated, individually well known and readily available. There are, however, various preferred composition components. These are primarily ones commonly having applications for which high impact strength is particularly desirable.

The preferred polyphenylene ethers are homo- and copolymers of the formula:

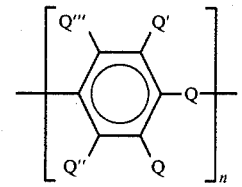

wherein Q, Q', Q" and Q'" are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q'" in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene)ether.

The alkenyl aromatic resins are likewise well known and are preferably derived from monomers of the formula:

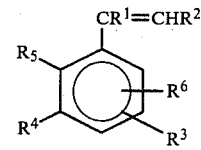

wherein $R^1$ and $R^2$ are selected from the group consisting of lower alkyl or alkenyl groups of from 1 to 6 carbon atoms and hydrogen. $R^3$ and $R^4$ are selected from the group consisting of chloro, bromo, hydrogen and lower alkyl of from 1 to 6 carbon atoms; $R^5$ and $R^6$ are selected from the group consisting of hydrogen, halogen and lower alkyl and alkenyl groups of from 1 to 6 carbon atoms or $R^5$ and $R^6$ may be concatenated together with hydrocarbyl groups to form a naphthyl group.

Specific examples of preferred alkenyl aromatic monomers include styrene, chlorosytrene, alpha-methylstyrene, vinyl xylene, divinyl-benzene and vinyl naphthalene. Styrene is particularly preferred.

Rubber modification of the foregoing alkenyl aromatic resins may also be accomplished in known manner. Graft modification utilizing butadiene (with or without additional monomer) or ethylene-α-olefinpolyene terpolymer as previously described are particularly preferred. For this purpose, especially desirable α-olefins have from 3 to 20 carbons; especially desirable polyene are non-conjugated (either cyclic or open-chain) dienes having from 4 to 20, most desirably from 5 to 20 carbons.

One preferred class of such grafted resins is the rubbery modifiers of ethylene-propylene. These modifiers are desirably composed of from 20 to 80 mole percent of ethylene and 20 to 80 mole percent propylene. Another preferred class is the so-called EDPM interpolymers. These are desirably composed of a modifier having from 10 to 90 mole percent ethylene, 10 to 90 mole percent α-olefin and 0.1 to 10 mole percent polyene. The modifiers may be grafted with alkenyl aromatic in virtually any proportion. Desirably, however, the modifier (or rubbery portion of the resultant alkenyl aromatic resin) comprises from 10 to 70%, most preferably from about 40 to 60% by total weight of the grafted reaction product.

The polyphenylene ether and alkenyl aromatic resin components of the present compositions may be admixed in any proportion. Widely divergent proportions of from 1 to 99% by weight are known for such types of composition. More desirable, they are in a weight ratio of from about 1:5 to 5:1, most preferably about 1:1 for use in the present compositions.

The improved electrical properties of the present invention are obtained by incorporation of certain anti-static agents within the foregoing thermoplastic compositions. An effective amount of anti-static agent, generally at least 2%, preferably from 2 to 20%, by total weight is employed.

Styrene-allyl alcohol copolymer useful as an anti-static agent is available commercially or may be produced by known technique. The copolymer desirably has a molecular weight of between 600 to 5,000, more desirably from about 1,000 to 1,500. Preferably the copolymer is also a random copolymer and has an alcohol degree of polymerization of from 10 to 30.

The high molecular weight poly(ethylene oxide) anti-static agent must be produced by anionical polymerization. Suitable techniques are known and described, for example, by F. W. Stowe and J. V. Stratta in the Encyclopedia of Polymer Science, Vol. 6, p. 103, and by F. E. Bailey, Jr. and J. V. Kolesko, "Polyethylene oxide", Academic Press (1976). This resin desirably has a molecular weight of between 400,000 to 1,500,000 and more desirably from about 600,000 to 1,000,000.

The components of the present composition may be combined in any known manner. Preferably, they are mixed together in particulate form. They may then be extruded in combination to ensure a homogeneous composition.

The present compositions may also contain conventional polymer additives. These additives, including: pigments, such as titanium dioxide; fire retardants, such as phosphorous compounds; and the like; perform in known manner without detracting from the improved properties of this invention.

The following example is given by way of illustration only and is not intended as a limitation on the scope of this invention. Many variations are possible without departing from its spirit and scope. Unless otherwise specified herein, all proportions are provided on a weight basis.

EXAMPLE I

An equal weight admixture of particulate polyphenylene ether and rubber-modified polystyrene (FG 834 produced by the Foster Grant Company) is prepared and divided into five 100 gram samples. One sample (designated "A") is set aside as a control, while the others are admixed with 10 grams of, respectively:

"B"—styrene-allyl alcohol random copolymer having a molecular weight of 1150 number average and 1700 weight average, and containing 7.7% hydroxyl (RJ-101 resin produced by Monsanto Chemical Company).

"C"—styrene-allyl alcohol random copolymer having a molecular weight of 1600 number average and 2300 weight average, and a hydroxyl content of 5.7% (RJ-100 resin produced by Monsanto Chemical Company).

"D"—anionically polymerized poly(ethylene oxide) having an estimated molecular weight of 400,000 (WSR-N-1105 resin produced by Union Carbide Company).

"E"—anionically polymerized poly(ethylene oxide) having a molecular weight of 90,000 (WSR-N-10 resin produced by Union Carbide Company).

These sample compositions are extruded and molded into $\frac{1}{8}'' \times 4''$ discs. They are tested for electrical properties by being exposed twice to first positive and then negative corona discharges of 10 kv under a relative humidity of 35% and temperature of 70° C. The charges produced on the tops and bottoms of the exposed discs are measured over a time to determine their relative magnitudes and rates of decay.

Testing is carried out using the procedure described by Jay L. Rogers in SPE Journal, January, 1973, pages 28-55 (see pages 29 and 30).

Briefly, the test measuring device consists of a 10 kv dc (1 ma) high-voltage power supply attached to two fine 5 mil resistance wires 14 in. in length and spaced 1 in. apart, horizontally and parallel, in a glass frame. The device is turned on at the variable transformer or through a foot switch in the circuit on the input side of the power supply only while a test disc is being charged underneath the wires, and is turned off immediately thereafter. The wires ionize the air, charge the test disc, and complete the circuit through the grounded plate of the measuring device.

The charged disc is placed under the static detector head on an insulated stand at a distance of $\frac{3}{8}$ inch. Decay readings are taken on both sides (top and bottom) of the test disc at 5, 15, 30 and 60 min. The results are as follows:

| Initial | 5 Min. | | 15 Min. | | 30 Min. | | 1 Hour | |
|---|---|---|---|---|---|---|---|---|
| Top | Top | Bot | Top | Bot | Top | Bot | Top | Bot |
| | POSITIVE 10 KV | | | | | | | |
| | First Run | | | | | | | |
| A 15.5Kv | 10.1 | 5.0 | 7.5 | 4.3 | 6.9 | 3.2 | | |
| B 15.5 | 9.8 | 5.2 | 7.4 | 4.4 | 7.0 | 3.7 | | |

-continued

| Initial | 5 Min. | | 15 Min. | | 30 Min. | | 1 Hour | |
|---|---|---|---|---|---|---|---|---|
| Top | Top | Bot | Top | Bot | Top | Bot | Top | Bot |
| C 16.8 | 12.0 | 6.8 | 8.8 | 5.4 | 7.4 | 4.7 | | |
| D 10.0 | 2.8 | 0.4 | 1.7 | 0.3 | 1.5 | 0.9 | | |
| E 13.0 | 6.5 | 2.9 | 3.5 | 1.5 | 2.7 | 1.2 | | |
| Second Run | | | | | | | | |
| A 17.5 | 11.1 | 7.4 | 7.8 | 5.2 | 6.3 | 4.2 | | |
| B 18.5 | 13.0 | 5.8 | 7.9 | 4.1 | 7.7 | 4.2 | | |
| C 17.2 | 12.5 | 5.7 | 9.4 | 4.9 | 7.9 | 4.9 | | |
| D 11.0 | 4.4 | 1.5 | 1.9 | 0.5 | 1.0 | 0.4 | | |
| E 12.5 | 6.4 | 3.2 | 3.4 | 1.5 | 2.9 | 1.3 | | |
| NEGATIVE 10 KV | | | | | | | | |
| First Run | | | | | | | | |
| A −14.0Kv | −8.2 | −3.0 | −4.1 | −0.5 | −4.1 | 0.7 | −3.2 | 0.8 |
| B −14.8 | −11.0 | −3.4 | −5.5 | −0.6 | −5.1 | −0.5 | −4.2 | 0.7 |
| C −13.0 | −10.2 | −3.1 | −7.9 | −1.6 | −6.9 | 1.7 | −4.7 | 1.6 |
| D −10.5 | −2.4 | 1.5 | −0.9 | 1.8 | −0.2 | 1.9 | 0.3 | 1.4 |
| E −13.2 | −4.0 | 0.9 | −0.3 | 2.8 | −0.1 | 2.3 | 0.3 | 1.9 |
| Second Run | | | | | | | | |
| A −16.0 | −9.3 | −3.1 | −7.1 | −1.6 | −1.5 | −1.1 | −4.5 | −0.7 |
| B −18.0 | −9.9 | −2.4 | −8.1 | −1.0 | −6.6 | −0.4 | −6.1 | −0.4 |
| C −16.5 | −11.5 | −3.4 | −7.5 | −2.0 | −6.8 | −0.7 | −6.2 | −0.5 |
| D −12.1 | −3.8 | −0.5 | −1.1 | 1.6 | −0.2 | 1.6 | 0.1 | 1.3 |
| E −12.5 | −4.8 | −0.3 | −1.5 | 1.5 | −0.5 | 2.2 | 0.6 | 2.3 |

As shown by the above, the anionically polymerized poly(ethylene oxide) anti-static agent produces greatly superior electrical properties. Under similar conditions, these compositions both accept lesser initial charges and dissipate charge at a faster rate than the other sample compositions. While not as consistent, the presence of styrene-allyl alcohol copolymer provides numerous instances of superiority to the control compositions lacking any anti-static agent.

The above mentioned patents and/or publications are incorporated herein by reference. Obviously, other modifications and variations of the present invention are possible in light of the above teachings. For instance, instead of poly(2,6-dimethyl-1,4-phenylene) ether, copolymers such as poly(2,6-dimethyl-co-2,3,6-trimethyl-1,4-phenylene)ether can be used. The compositions can also contain other ingredients, such as flame retardants, drip retardants, fillers and/or reinforcements, impact modifiers, antioxidants, colorants, in conventional amounts. It is therefore to be understood that changes may be made in the particular embodiments of the invention described which are within the full intended scope of the invention as defined by the appended claims.

I claim:

1. In a thermoplastic composition comprising polyphenylene ether and alkenyl aromatic resin, the improvement wherein said composition contains an effective amount of an anti-static agent selected from the group consisting of styrene-allyl alcohol copolymer, anionically polymerized poly(ethylene oxide) and a combination thereof.

2. The composition of claim 1, wherein the weight ratio between polyphenylene ether and alkenyl aromatic resins is from 1:5 to 5:1.

3. The composition of claim 1, wherein the alkenyl aromatic resin comprises rubber-modified high impact polystyrene.

4. The composition of claim 3, wherein said composition contains at least 2% by total weight of anti-static agent.

5. The composition of claim 4, wherein the anti-static agent comprises styrene-allyl alcohol copolymer having a molecular weight between 600 and 5,000.

6. The composition of claim 5, wherein the copolymer is a random copolymer having an alcohol degree of polymerization of from 10 to 30.

7. The composition of claim 6, wherein said composition contains from 2 to 20% copolymer by total weight.

8. The composition of claim 4, wherein the anti-static agent comprises anionically polymerized poly(ethylene oxide) having a molecular weight between 50,000 and 1,500,000.

9. The composition of claim 8, wherein said composition contains from 2 to 20% anionically polymerized poly(ethylene oxide) by total weight.

* * * * *